Patented Dec. 7, 1926.

1,609,720

UNITED STATES PATENT OFFICE.

GEORGE F. HUMPHREY, OF BRIDGETOWN, NOVA SCOTIA, CANADA.

METHOD OF PRESERVING FRUITS AND VEGETABLES.

No Drawing.     Application filed December 13, 1922.   Serial No. 606,727.

This invention relates to the preservation of fruits and vegetables, and the main object of the invention is to provide a method of impregnating previously evaporated or dried fruits, vegetables and other alimentary substances with extracts or juices from the same or other fruits or vegetables, for the purpose of rendering the finished product more nutritious and more palatable than when in its original state.

Evaporated or dried fruits and vegetables are prevented from deterioration by having their water content reduced to such a degree that the growth of bacteria and mould cannot take place while they remain in this dried condition. These products are restored to something of their original condition as regards nutritive value by restoring the same amount of water that had previously been extracted.

In preparing fruits and vegetables for drying or evaporating, the loss in parings, trimmings, etc., is at least 20%, and although of equal nutritive value to the prime portions they are not suitable for culinary purposes. Hitherto a part of this waste has been disposed of by evaporating it and mixing it with cereals and other products and then manufacturing it into animal foods.

My invention consists essentially in utilizing the juices extracted from the parings and trimmings of fruits by substituting these juices for water when preparing evaporated fruits for cooking. While my process has been particularly adapted to the utilization of apple juice, it is also applicable to any kind of fruit, vegetables and other alimentary substances.

In carrying out my invention as applied, for instance, to apples, there is approximately 20% of the contents of the apples wasted in preparing the fruit for the evaporating or drying process. I take this waste product and press out or extract the juice which I use in such a manner as not only to prevent waste, but also to produce a new product which contains a higher proportion of nourishment and also has superior keeping qualities to any product heretofore produced.

Dried or evaporated apples will absorb from three to four times their own weight of water when being prepared for cooking, but, instead of hydrating the apples with water I make use of the extracted juices from the parings or from whole apples or from other fruits or mixtures of fruits, for example, I take say one hundred pounds of evaporated apples and immerse them in a tank of heated apple juice and maintain a temperature of approximately 130 to 150° F. until this juice has permeated to the centre of the fruit. This usually requires from two to three hours, but, of course, is usually governed by the thickness of the fruit. After this period I increase the temperature gradually to about 180° F. and finally to 212° F., continuing the boiling operation until the fruit has become more or less transparent and inversion of the sugar has taken place. I then remove the fruit from the hot syrup and place it on trays to drain. As soon as the surface moisture has disappeared the fruit is then subjected to a drying process and this secondary drying should be commenced before the fruit becomes cool. To obtain the best results the drying chamber should have a temperature of from 200 to 210° F. When the surface of the fruit has become dry enough to permit handling without stickiness, the temperature is reduced to about 150° F. and drying is continued with an increased volume of air at temperatures ranging from 150° to 130° F. This final period of drying is usually carried on from four to five hours.

Owing to the inversion of the sugar content, this product now resembles raisins in nutritive properties and requires no further cooking treatment, but may be used in the same manner as raisins and currants. The product may also be used as a conserve or dessert by adding a small proportion of water or syrup, as desired, and then heating. No cooking operation is necessary.

This process may be applied to various fruits and mixed fruit juices may be employed to produce distinctive flavors. Dehydrated vegetables may also be treated in a similar manner.

Having thus described my invention, what I claim is:—

1. A synthetic dried fruit consisting of whole dried fruit containing juice of at least one other variety of fruit.

2. A method of making a synthetic dried whole fruit, comprising subjecting an uncooked fruit of one kind to drying action, drenching the dried or partially dried fruit with the expressed uncooked juice of another kind of fruit and subjecting the treated fruit to further drying action.

In witness whereof, I have hereunto set my hand.

GEORGE F. HUMPHREY.